United States Patent [19]

Pieper

[11] 4,027,091

[45] May 31, 1977

[54] METHOD AND APPARATUS FOR THE INDIRECT HEATING OF GLASS-CARRYING PASSAGES, FEEDERS AND FEEDER HEADS

[75] Inventor: Helmut Pieper, Lohr am Main, Germany

[73] Assignee: SORG GmbH & Co., Pflochsbach, Germany

[22] Filed: Jan. 20, 1975

[21] Appl. No.: 542,737

[52] U.S. Cl. .................................................... 13/6
[51] Int. Cl.² ......................................... C03B 5/02
[58] Field of Search ................................. 13/6, 23

[56] References Cited

UNITED STATES PATENTS

| 2,490,826 | 12/1949 | Mochel | 13/6 UX |
| 2,830,107 | 4/1958 | Hahn et al. | 13/23 X |
| 3,636,227 | 1/1972 | McQuaid | 13/6 |
| 3,681,506 | 8/1972 | Can | 13/6 |

Primary Examiner—R. N. Envall, Jr.
Attorney, Agent, or Firm—Burgess, Dinklage & Sprung

[57] ABSTRACT

The present invention relates to a method for indirectly heating glass-carrying channels or passages, feeders and feeder heads, and to an apparatus for carrying out such method.

10 Claims, 5 Drawing Figures

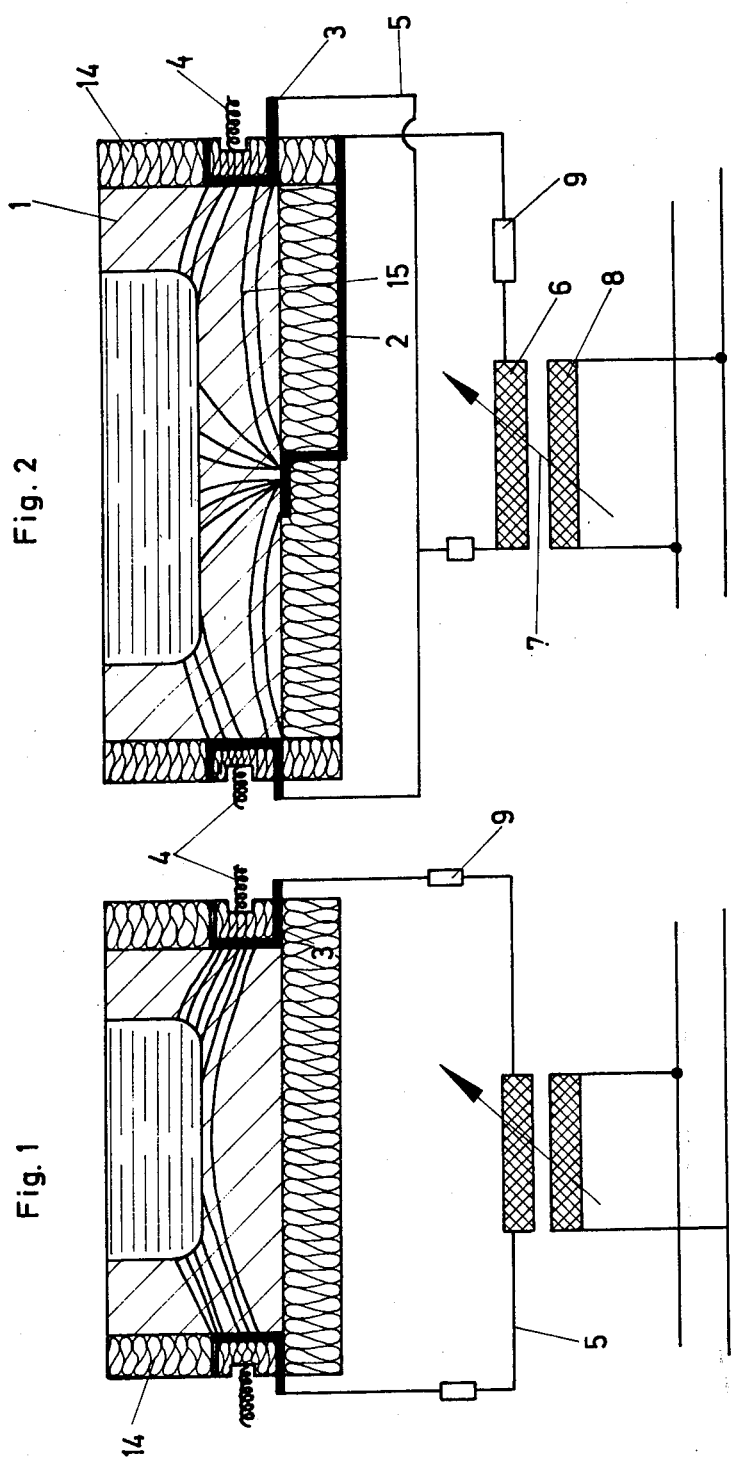

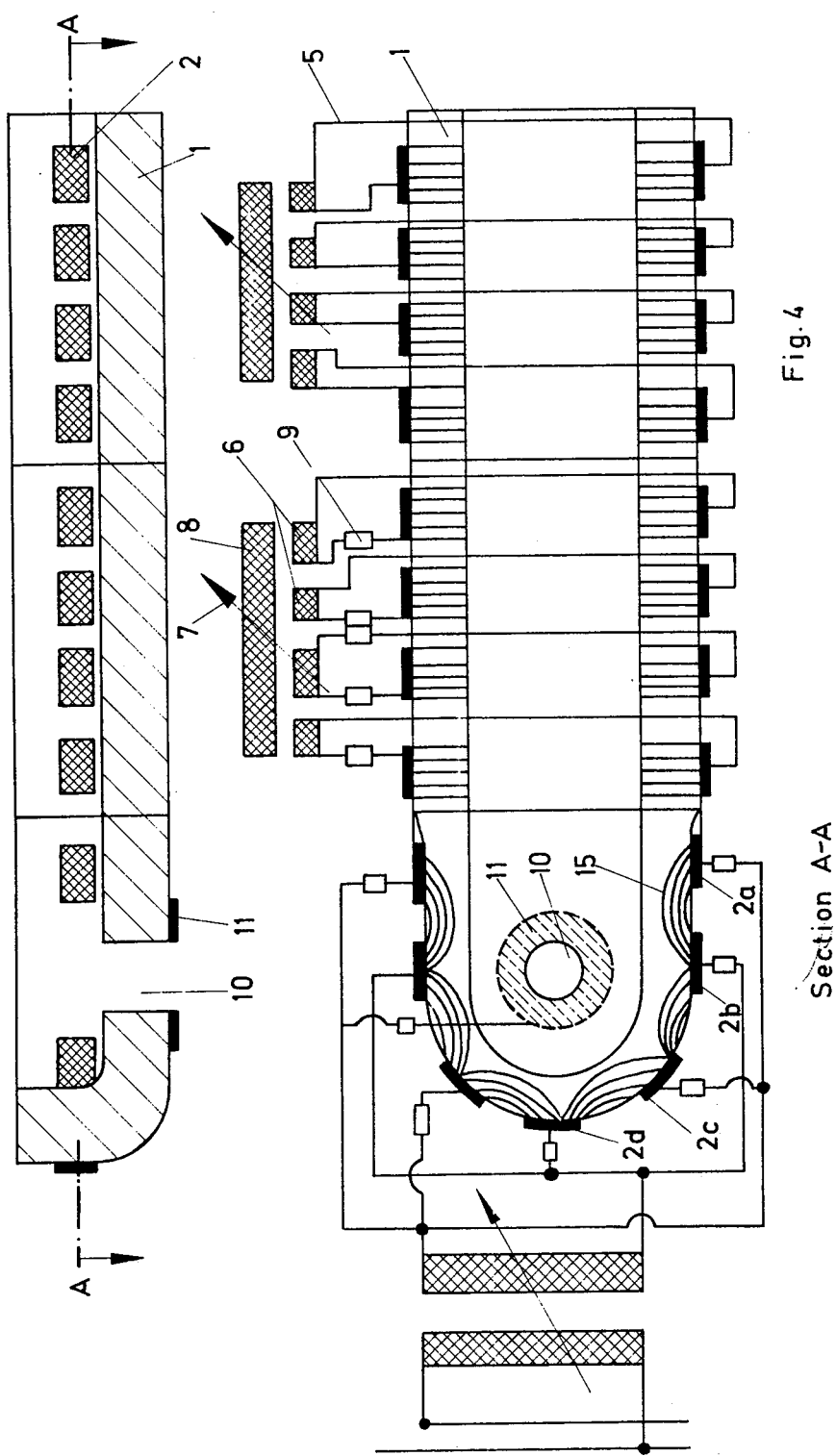

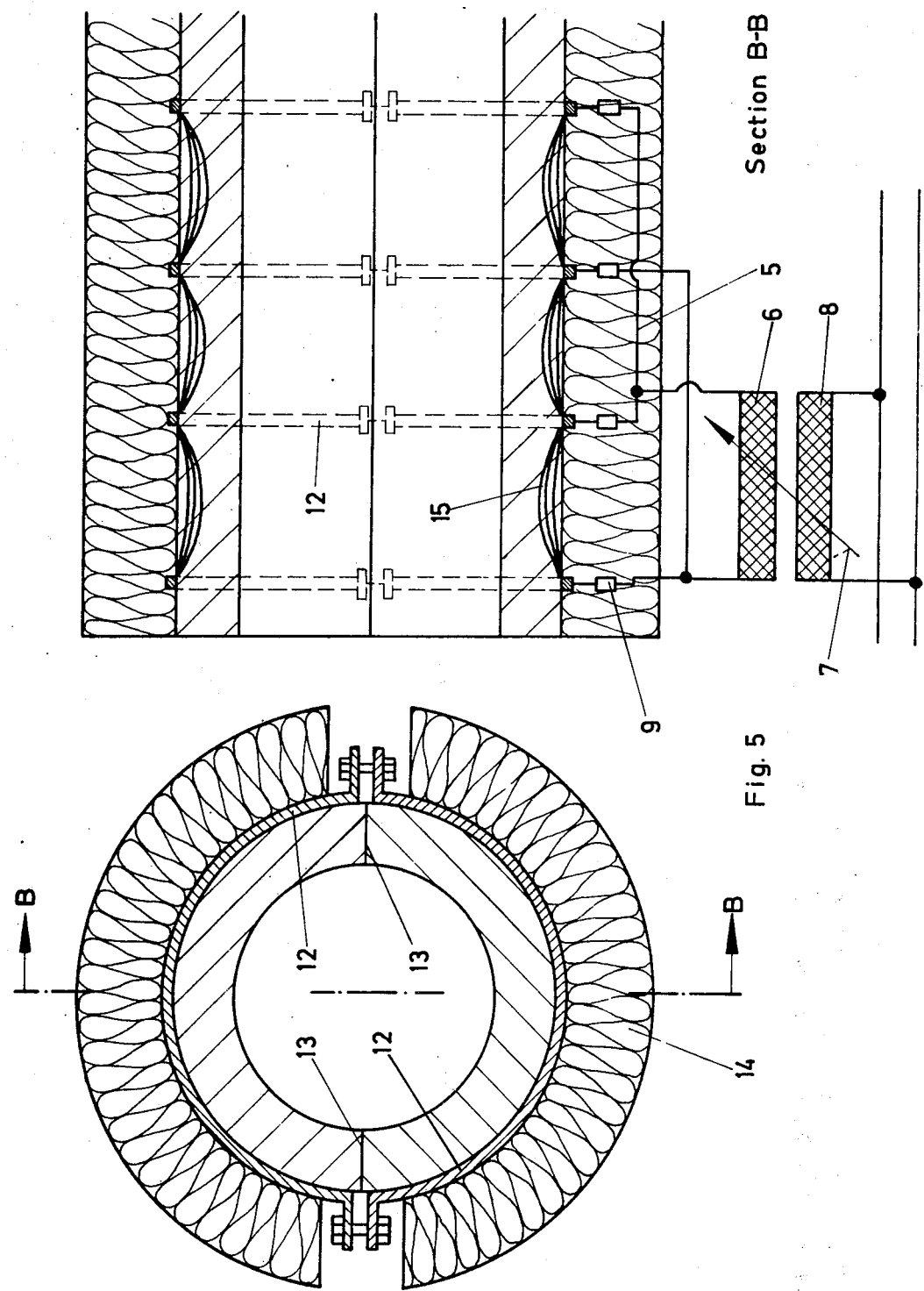

METHOD AND APPARATUS FOR THE INDIRECT HEATING OF GLASS-CARRYING PASSAGES, FEEDERS AND FEEDER HEADS

It is already known and commonly practiced to heat the feeders, glass channels or passages and feeder heads either by means of electrodes which are immersed into the molten glass mass, or by means of an indirect resistance heating assembly which is mounted to the outer side of the refractory material and which is exteriorly surrounded by an insulation.

However, the direct heating by means of electrodes immersed into the molten glass mass suffers from the disadvantage that the generated energy concentrates at the tips of the electrodes such that the glass is heated to a greater degree at these points and thermal inhomogenities are apt to occur at these places. Besides, the electrodes are either of a reducing nature (molybdenum) or of an oxidizing nature (tin oxide) whereby undesired contamination may result. Further, in the case of excessive heating by individual electrodes bubble formation may occur in the area of contact between the glass and the electrode.

The indirect heating by means of resistance wires disposed exteriorly of the gutter or kennel of refractory material (Zac) has not proved to be advantageous either, because the cross-sectional areas of these resistance wires must be relatively small in order to receive a sufficient amount of energy, while, on the other hand, the operational life of the wires is too short at the required constant temperatures of about 1300° C, partly due to their small cross-sectional areas.

The heating by means of radiators has been found to be not satisfactory either, because in such case a great part of the energy is reflected from the surface and, further, the surface is heated to the highest degree, which likewise may result in temperature inhomogeneity.

Accordingly, it is the object of the present invention to provide a method and an apparatus for the heating of glass flowing within passages, feeders and feeder heads, which makes it possible to obtain a high temperature homogeneity of the flowing glass and which neither show the low heating efficiency and the susceptibility to trouble of the resistance heating assembly, nor produce contamination and gas generation within the glass while preventing consumption of electrodes.

Furthermore, the recognized and above-discussed disadvantages of the feeder heating means can be avoided and, by following an entirely novel technical way, a feeder heating means insusceptible to trouble can be devised which provides a heretofore not attained degree of temperature homogeneity and which may be utilized economically, which heating means further permits its adaptation to the most varied types of glass and which readily allows the temperature to be adapted to the most varied processing conditions.

According to the present invention, this object is solved in that the heating current flows directly through the refractory material (Zac) of the glass passage, of the feeder or of the feeder head.

Advantageously, in order to render the heating effect uniform and to avoid trouble, the heating current may be conducted in a plurality of circuits each of which is adapted to be switched off when consuming a higher than a predetermined power.

Preferably, the apparatus for carrying out the method of the present invention is characterized by a plurality of flat electrodes which are pressed against the refractory material subjected to high temperatures, and which are supplied with electrical energy via independent circuits.

In order to facilitate control of the separate circuits, the secondary side of an isolating and/or variable transformer for feeding the respective independent circuits may be divided into a plurality of galvanically isolated coils or windings, and each of the heating current circuits may include an overload relay or a fuse or circuit breaker which serve to turn off the circuit when a given power input is exceeded.

With the feeder heating arrangement according to the invention, it is possible to construct the feeder as a glass-carrying passage of tubular configuration which is filled with liquid glass up to its top and wherein the electrodes are strips surrounding the tube material, whereby the current flows from one strip to to the next one in succession.

In the regions of gaps formed, the strips are preferably divided or split, and they do not contact the refractory material in order to prevent the current from flowing through the glass present in the gaps.

The electrodes per se may be in the form of strips or tapes, whereby a portion or an end of the strip is bent at an angle and passed to the exterior through the insulation covering the refractory material such that these lead out and relatively cold ends may readily be connected to electrical conductors for connection to the transformers.

Furthermore, advantageously the electrodes may be installed with greatest concentration and supply a maximum amount of energy at those points where the temperature of the flowing glass is lowest.

Thus, according to the present invention in a manner being surprising to the expert it is possible to effect an improved heating of the feeder by a technically novel method, namely by utilizing the refractory material as a resistance heating conductor.

In the following, exemplary embodiments of the invention are described in greater detail by referring to the enclosed drawings, wherein:

FIG. 1 shows a schematical cross-section view of a feeder according to the present invention;

FIG. 2 shows a schematical cross-section view similar to FIG. 1, but including three electrodes;

FIG. 4 shows a schematical plan view and a side elevational view of a feeder passage having a feeder head, to which the method according to the present invention is applied; and FIG. 5 shows a schematical plan view and a sectional view of the feeder passage having a tubular configuration.

Figure 3:
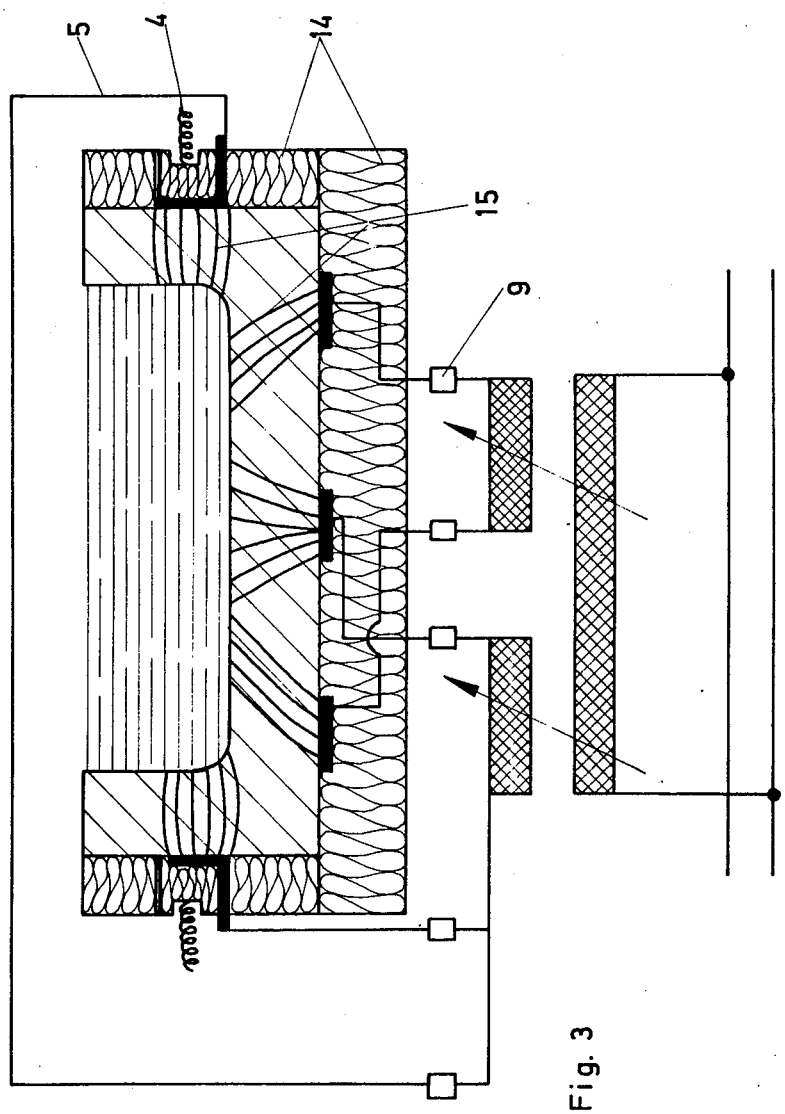
FIG. 3 shows a similar cross-sectional view as FIGS. 1 and 2, but including four electrodes and a transformer having a pair of secondary windings.

The method according to the invention is based upon the fact that the refractory material, particularly if materials cast in molten, liquid form are involved, is conductive at high temperatures. Thus, the method is useful for such glass-carrying passages, feeders and feeder heads in which this condition is present.

The resistivity of the refractory material (customarily termed Zac in Germany) at the temperatures involved within a glass-carrying passage is about five times as high as the resistivity of a normal lime-sodium glass. Thus, in the case of the normal wall thicknesses in such feeder passages (about 15 centimeters) it is possible to pass a current through the refractory material thereby to heat this material. To this end, there are used voltages of between 200 and 300 volts which necessitate an electrical insulation of the voltage-carrying portions for personnel protection.

The applicable temperature for the refractory material is at least as high as 900° C; i.e. the glass receiving gutter or kennel must be insulated in order to provide such a differential temperature between outer and inner walls which is as small as possible and which causes the exterior temperature to rise above 900° C, too.

Electrodes 2 are applied to the outer wall of the refractory material 1 of a correspondingly formed feeder gutter or kennel or of a corresponding passage or feeder head, between the insulation 14 and the refractory material 1. These electrodes 2 consist of a highly heat resistant material, e.g. of the well-known hot conductor material "Aluchrome", or of other highly alloyed refractory steels, e.g. of highly alloyed nickel, chromium or molybdenum steels. Expediently, the insulation of well-known materials is movable in the region of the electrodes 2, and it may be urged against the electrodes 2 by springs 4 such that the electrodes 2, in turn, are pressed against the refractory material and such that a good electrical contact, between the electrodes 2 and the refractory material 1 is always ensured.

If the electrodes 2 are attached below the refractory material 1, the contact pressure exerted by the weight of the refractory material or of the glass-carrying passage is sufficient to provide an adequate contact.

Expediently, the electrodes 2 are formed in the shape of an elongate strip, whereby one end 3 thereof is passed through the insulation to serve as a contact lug to which conductor 5 for supplying electrical energy may be connected.

For the uniform heating of e.g. a feeder, it is required that the electrodes 2, depending on the configuration of the feeder, are arranged such as to provide for the optimum uniform heating of those places where the temperature of the gutter or kennel is normally at its lowest value. Thus, preferably a particularly great number of electrodes 2 will be provided in these regions, or the electrodes 2 will be placed such that corresponding, desired current paths are formed. Hereby, it has to be taken into consideration that the current will take the path of lowest resistance and, accordingly, it will flow across the particularly well heated areas or across the shortest paths, in accordance with the well-known laws of physics. It has to be noted hereby that the resistance decreases with increasing temperature in the case of the material as presently employed.

As shown in FIGS. 1 to 3, a feeder passage being open at its upper side has inserted near the bottom of the passage, electodes 2 with their ends 3 bent at an angle, which electrodes are pressed against the bottom by springs 4, with the insulation 14 serving to prevent heat losses and to secure the adjustment of the temperature of the refractory material 1 to the proper level.

The approximate principal current path is indicated by lines 15, and as the resistance of the glass, as mentioned, is substantially lower than that of the refractory material, a certain portion of the current will thus flow through the molten glass mass proper.

The electrodes 2 are arranged primarily in the lower region of the gutter or kennel in order to heat this lower portion, because an equalization of temperature is readily effected from below to above, but not from above to below.

A substantial advantage of the heating system according to the invention resides in the fact that the plates may be intentionally placed in such a way that every part of the gutter or kennel can be heated, as is clearly evident from the drawings. Hereby, the energy density or the flow of energy within the refractory material may be kept very low in relation to the volume unit, as the surface areas covered by the electrodes 2 may be chosen as large as desired. With an adequate insulation, the temperature of the gutter or kennel may be adjusted to any value as desired, or any desired equalization of temperature may be provided, such that optimum uniformity of the temperature within the feeder or feeder head or within another glass-carrying passage can positively be obtained.

As shown in FIG. 4, a great number of electrodes 2 may be arranged in side-by-side relation across the entire length of the feeder passage, whereby the current flows transversely through the feeder passage at each electrode location. The feeder head per se has a circular electrode 11 positioned underneath the discharge 10 which electrode is coupled to the electrodes 2 arranged around the feeder head. In this manner, it is easily possible to correspondingly heat the otherwise coolest part of the feeder, namely the bottom of the feeder head, and to avoid temperature inhomogeneities of the discharged glass due to cooling of the glass at the discharge.

According to the invention, it is expedient to divide the heating arrangement of the feeder or of the feeder head into a plurality of separate zones which are independently supplied with electrical energy by galvanically separated (isolated) secondary windings in separate circuits. Hereby, it is further expedient to keep the resistance of a pair of parallel circuits approximately equal, or to match to each other the resistance of corresponding heating circuits arranged in parallel with each other. To this end, the secondary side of an isolating or variable transformer may comprise a plurality of secondary windings 6 which are excited by a common primary winding 8, whereby — as indicated by arrow 7 — an individual control of the various secondary circuits is possible.

The construction of isolating or variable transformers of this type is known to one skilled in the art and, thus, need not be described in any greater detail at this place.

Each of the heating circuits includes a fuse or a corresponding overload relay, indicated at 9, which turns off the respective heating circuit when fed with a higher than a predetermined heating power. In this manner, it is avoided that individual heating circuits are overloaded so as to produce excessive temperatures.

However, the sectioning of the heating arrangement into a plurality of independent heating circuit and the use of the fuses 9 are also necessary to provide for the situation in which due to crack formation of the refractory material which cannot be avoided at all, the separate current paths is affected by the entering of glass into the crack.

If molten glass entered such a crack, the resistance would be substantially reduced at this place by the glass penetrating the crack. This would result in a concentration of energy within the crack and, thus, in further cavitation and in an increase of the size of the crack; accordingly, each individual heating circuit must be safely protected against occurence of trouble of this kind. Such positive protection is provided by the above-described division into a plurality of separate heating circuits which are separately protected by fuses.

FIGS. 1 to 3 illustrate the circuit arrangement of individual heating circuits whereby, as shown in FIG. 1, a secondary winding supplies a pair of oppositely disposed electrodes 2 via conductors 5 and a fuse 9, while according to FIG. 2 a center electrode is supplied by the secondary winding via conductors 5 and a fuse, which center electrode is coupled to a pair of likewise oppositely arranged and interconnected electrodes 2; on the other hand, according to FIG. 3 a transformer having two secondary windings feeds a total of five electrodes through the abovementioned wires and fuses. In the latter case, the center electrode is also connected in opposition to the two outermost electrodes, and the two electrodes positioned at the right and at the left of the center electrode are fed by the second secondary winding.

As shown in FIG. 4, a plurality of circuits may be arranged on a feeder in tandem in the direction of flow of the discharging glass, whereby the current at every location flows transversely through the refractory material and, further, through the molten glass mass, and whereby four secondary windings are each energized by a primary winding in a controllable manner. Of course, each circuit includes the customary protective elements 9, even if not particularly shown.

The first heating area heated at four locations, is followed by a corresponding second heating area, and the heating arrangement of the feeder head is then connected to the abovementioned circular electrode 11. In this case, the circuit arrangement is designet such that the current may flow e.g. from electrode 2a to electrode 2b, from which the current is adapted to flow not only to electrode 2a, but also to the adjacent electrode 2c at the opposite side and to the circular electrode 11.

The electrode 2c, in turn, may have a current connection to the center electrode 2d. Further details are evident to one skilled in the art from FIG. 4.

In a modified embodiment of the invention according to FIG. 5, the feeder passage may be of tubular configuration, whereby the level of the glass extends up to the level of the top of the tube such that formation of a gas cushion is prevented. Hereby, the electrodes are formed as strips, and the current flows from an electrode 12 to the pair of adjacently disposed electrodes each, unless the strip electrode 12 is positioned at the end of the heating area such that the current can flow in one direction only, as shown in FIG. 5.

In this embodiment, too, each heating circuit is separately protected by fuses or the like in order to avoid disadvantageous local overheating. The electrode strips 12 consist of the same highly heat resistant material as described above, and these electrode strips are preferably also split at the locations where a gap 13 exists in the refractory material. The split portion is bridged by a conductive connection; however, it is hereby prevented that any glass present within the gap produces a disadvantageous separate current path which would result in the disadvantages as described above in connection with the crack formation.

Apparently, the solution according to the present invention offers a novel and advantageous means for the heating of all kinds of glass-carrying passages, tubes or pipes and the like.

What we claim is:

1. Apparatus for indirectly heating molten glass-carrying passages, feeders and feeder heads comprising a structural refractory material having a resistivity greater than the resistivity of molten lime-sodium glass, said refractory material forming said passages, feeders and feeder heads, and a plurality of electrode means in contact with and mounted exteriorly of said refractory material forming said passages, feeders and feeder heads and means to supply said electrode means with electrical energy via independent heating circuit means.

2. Apparatus of claim 1 wherein the secondary side of an isolating and/or variable transformer for feeding the respective, independent circuit means is divided into a plurality of galvanically isolated coils or windings.

3. Apparatus of claim 1 wherein each heating circuit means includes an overload relay or a fuse which turns said circuit off when a given power consumption is exceeded.

4. Apparatus of claim 1 wherein said glass-carrying passage feeder or feeder head is formed as a tube which is filled with molten glass up to the level of its top wherein said electrode means comprise strips surrounding the material of said tube, whereby the current flows from one of said strips to the next successive one 5. Apparatus of claim 4 wherein said electrode strips do not contact the refractory material in the region of the gaps between tube segments.

6. Apparatus of claim 1 wherein said electrode means are strip-like in configuration having at least one end thereof bent at an angle with a current conductor connected thereto.

7. Apparatus of claim 1 wherein said electrode means are disposed more close to each other in areas where the feeder or passage has the lowest temperature.

8. Apparatus of claim 1 wherein resilient means are provided for pressing said electrode means against the refractory material.

9. Method for indirectly heating molten glass-carrying passages, feeders and feeder heads made of a structural refractory material having a resistivity greater than the resistivity of molten lime-sodium glass which comprises exteriorly contacting said refractory material forming said passages, feeder and feeder heads with a plurality of electrodes and passing heating current directly through said refractory material via said electrodes whereby said refractory material acts as a resistance heating conductor without direct contact between the molten glass and said electrodes.

10. Method of claim 9 wherein said electrodes are fed with heating current via a plurality of circuits, each circuit being adapted to be turned off when a higher power than a predetermined power is applied thereto.

* * * * *